Figure 1:
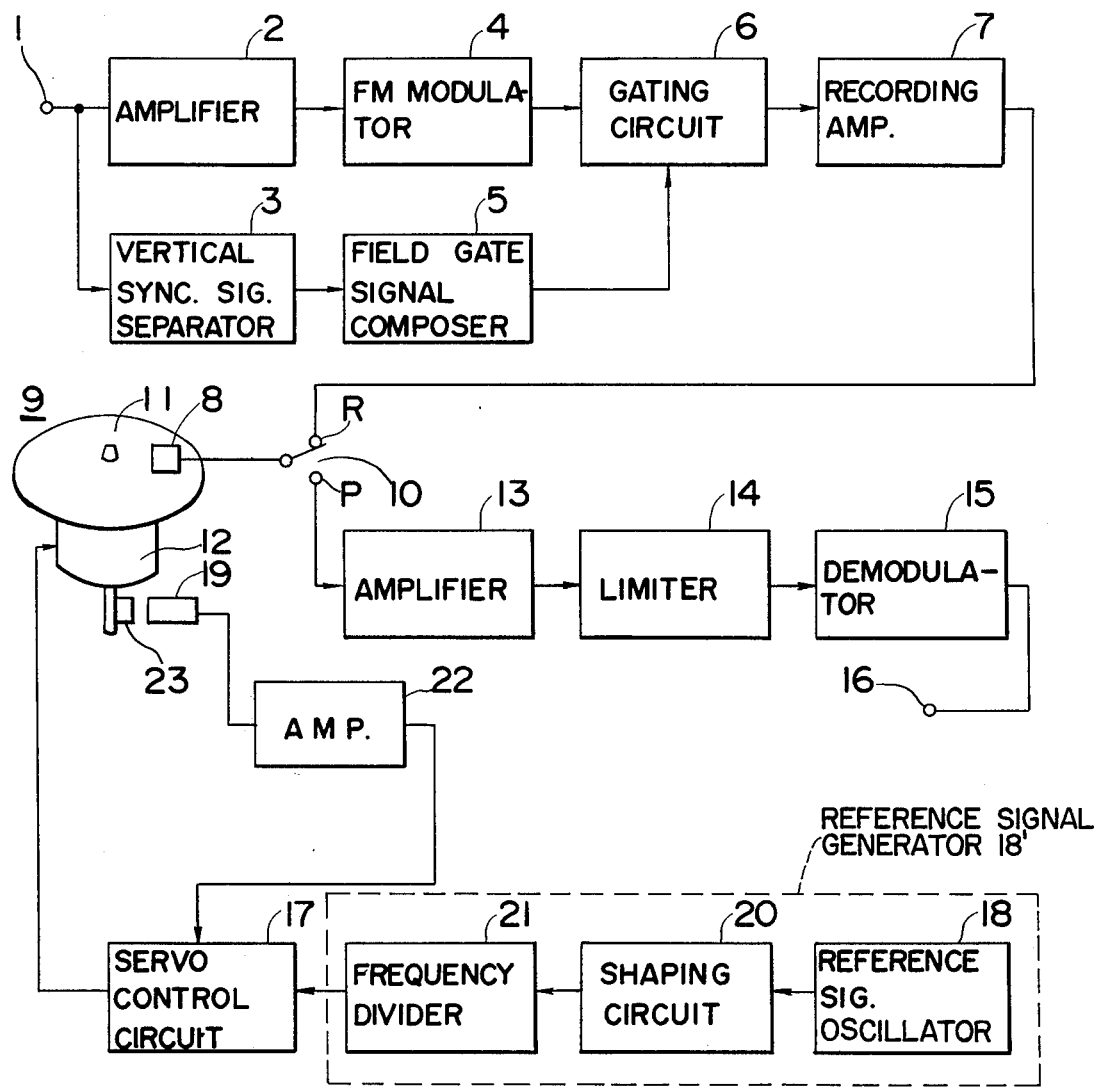

United States Patent [19]
Kubo

[11] 3,959,819
[45] May 25, 1976

[54] SERVO SYSTEM FOR VIDEO SIGNAL RECORDING AND PLAYBACK SYSTEM

[75] Inventor: Morihiro Kubo, Osaka, Japan
[73] Assignee: Sanyo Electric Co., Ltd., Japan
[22] Filed: Feb. 20, 1974
[21] Appl. No.: 444,136

[30] Foreign Application Priority Data
Mar. 13, 1973 Japan............................. 48-29282
Feb. 20, 1973 Japan............................. 48-20469

[52] U.S. Cl................................. 360/73; 360/10; 360/35
[51] Int. Cl.² ............... H04N 5/795; G11B 17/00; G11B 19/24
[58] Field of Search ............... 360/9, 10, 11, 35, 70, 360/73; 178/6.6 DD, 6.6 P, 6.6 FS, 6.6 SF

[56] References Cited
UNITED STATES PATENTS 3,636,253  1/1972  Notani et al. ......................... 360/10
3,718,754  2/1973  Goshima et al. ....................... 360/73
3,814,844  6/1974  Waldspurger ......................... 360/73

FOREIGN PATENTS OR APPLICATIONS
46-42846  12/1971  Japan .................................... 360/35

Primary Examiner—Raymond F. Cardillo, Jr.
Attorney, Agent, or Firm—Staas & Halsey

[57] ABSTRACT

A servo system for use in a video signal recording and playback apparatus to control rotation of an electric motor which drives a recording medium for the composite video signal. A reference signal generator generates a reference signal having a period equal to an integral multiple of the horizontal synchronizing period of the composite video signal. A servo control circuit controls the rotation of the electric motor in response to any phase difference between the reference signal and a rotational speed signal sensed from and corresponding to the speed of the electric motor.

7 Claims, 8 Drawing Figures (a) ROTATION SIGNAL (b) OUTPUT OF MONOSTABLE MULTIVIBRATOR MM (c) OUTPUT OF SAWTOOTH SIG. GENERATOR 25

(d) REFERENCE SIGNAL (e) OUTPUT OF FET Tr4

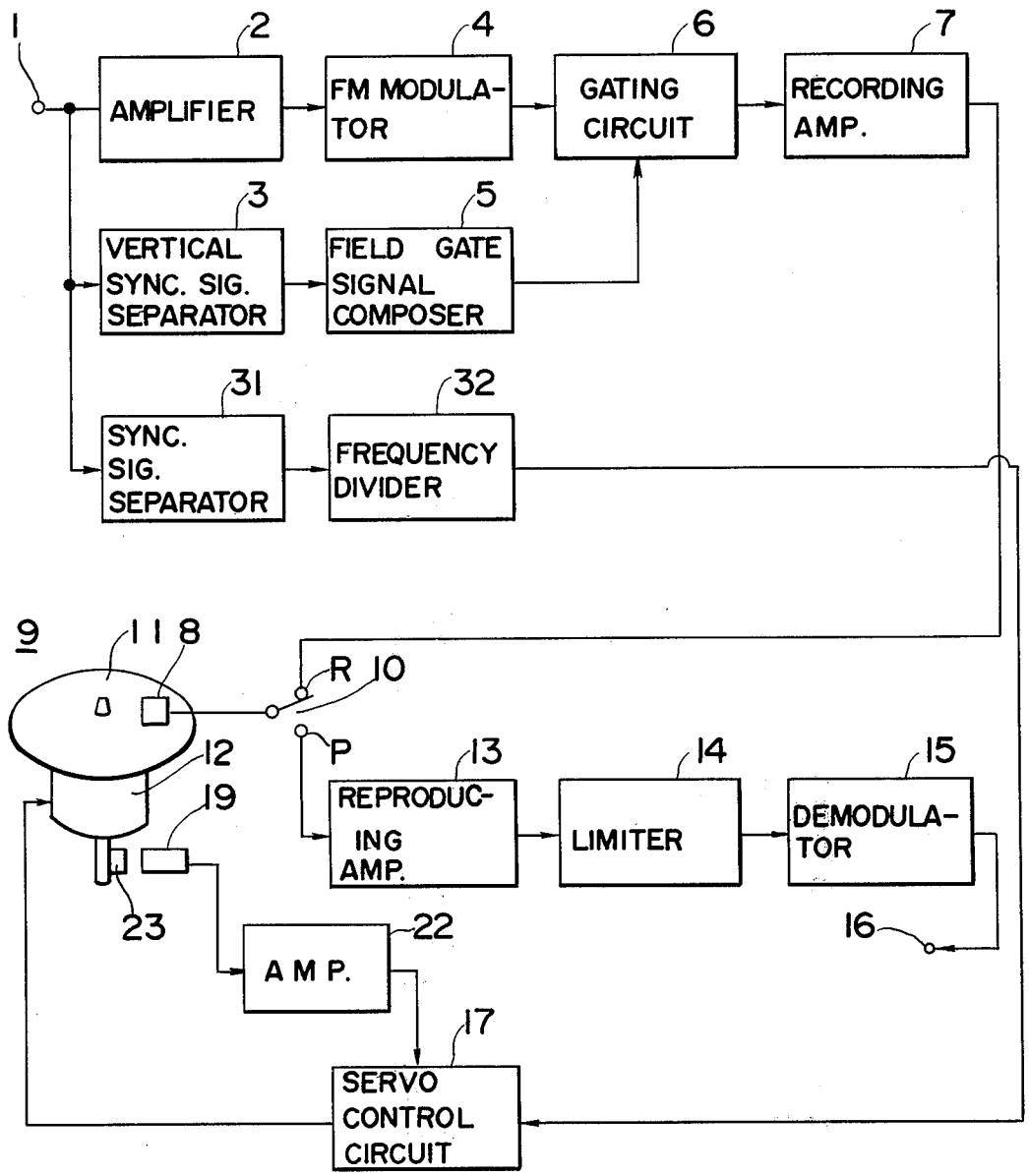
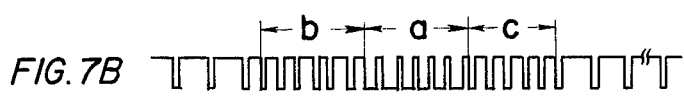

SERVO SYSTEM FOR VIDEO SIGNAL RECORDING AND PLAYBACK SYSTEM

The present invention relates to a servo system for use in a recording and playback apparatus for recording and/or reproducing still picture video signals in and/or from a recording medium which is rotated by an electric motor and, more particularly, to a servo system in which the electric motor is controlled to rotate in synchronism with a reference signal, the frequency of which is determined by the horizontal synchronizing frequency of the video signal.

In order to reproduce a still picture video signal on a kinescope, an apparatus for recording one field or one frame of a composite television signal on one circular track of a recording medium, such as magnetic disc, which is mounted on a rotational spindle driven by an electric motor is now under development and study.

In such recording apparatus, a field recording method wherein one field of the composite video signal is recorded on a circular track of a disc which rotates at 3600 r.p.m., is preferably adopted rather than a one frame recording method wherein one frame of the composite video signal is recorded on a circular track of a disc which rotates at 1800 r.p.m., partly because a disadvantage caused by time difference between even-numbered and odd-numbered field can be easily avoided and partly because jittering of the reproduced picture does not occur on a picture tube.

On the other hand, in such recording apparatus, it is necessary to provide a servo system for synchronizing the rotation of the disc with the starting point of the one field of the video signal, which is recorded on the track, in response to a phase difference between a reference signal and a rotational signal which represents the rotational phase of the disc or electric motor.

In such servo systems, the use of the vertical sync. signal, included in the composite video signal, as the reference signal is well known to those skilled in the art. However, if the video signal which is to be recorded is based on the Japanese or U.S. standard wherein one frame of a picture is composed of 525 horizontal scanning lines, said well known method has a disadvantage as described hereinafter. Namely, when the vertical sync. signal of the Japanese or U.S. standard is used as the reference signal for the recording apparatus of one field recording system as described above, the disc is compelled to complete one rotation during the vertical period which is equal to the period of 262.5H wherein H is the period of one horizontal scanning line. This means that an interval between the last horizontal sync. signal and the first horizontal sync. signal recorded on one circular track corresponds to the period of 0.5H.

When the video signal of one field which has been recorded on one circular track in the disc in such manner as described above is reproduced in order to obtain a still picture, distortion in the horizontal direction appears in the upper portion of the reproduced image on a picture tube. This distortion in the reproduced image (skew distortion) appears appreciably and then gradually disappears in accordance with such speed as determined by the time constant of the AFC (automatic frequency control) of the monitor television. One method for avoiding the defect is to reduce the time constant of the AFC, so that the horizontal blanking area near the start portion of the recorded video signal is drawn in the vertical blanking area. However, this method is not essential. According to another method, there is provided two paths one of which consists of a direct line and the other of which consists of a delay line of 0.5H. After passing the video signal which is reproduced from the recorded track through said two paths, the directly passed signal and the delayed video signal are used for driving a picture tube alternately so that such defects described above can be avoided. However, according to the latter method, there are disadvantages in that an expensive delay line and complicated circuit must be provided.

Accordingly an object of the present invention is to provide a servo system for use in a recording and reproducing apparatus for a video signal, which enables the composite video signal to be recorded in the recording medium in such a condition that a still picture is reproduced on a picture tube without defect as described above, with a simple and inexpensive circuit device.

Another object of the present invention is to provide a servo system for use in a recording and reproducing apparatus for a video signal, which employs a reference signal having a period equal to an integral multiple of the period of the horizontal sync signal included in the video signal, said reference signal being obtained by an oscillating means which is provided in the recording and reproducing apparatus.

A further object of the present invention is to provide a servo system for use in a recording and reproducing apparatus for a video signal, which employs a reference signal having a period equal to an integral multiple of the period of the horizontal sync included in the video signal, said reference signal being derived from the video signal which is to be recorded in the recording medium.

Figure 2:
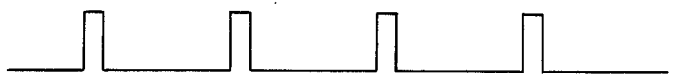
Figure 3:
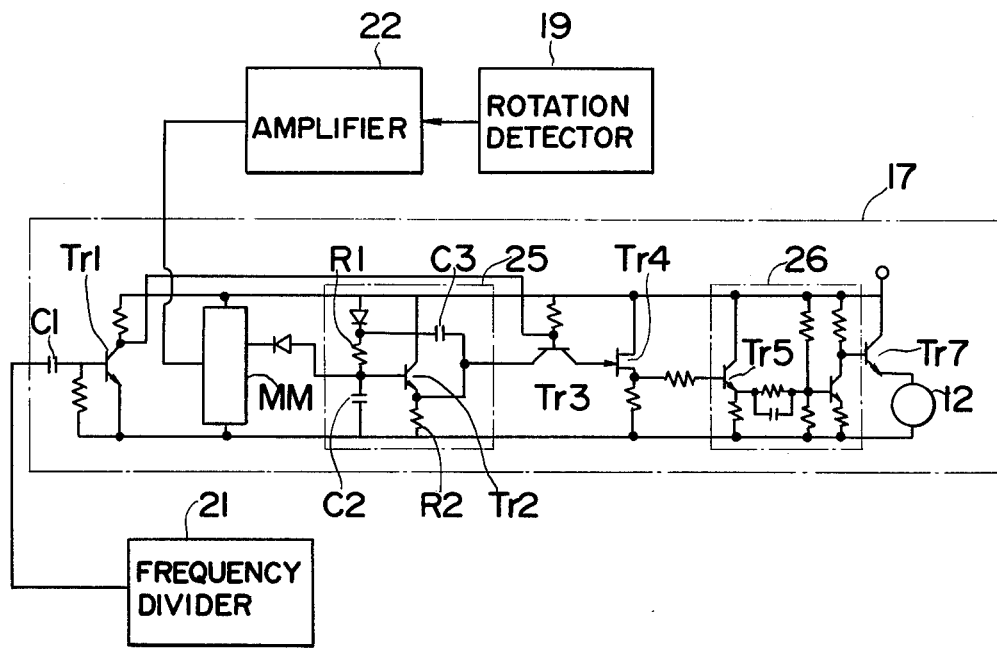
Figure 4:
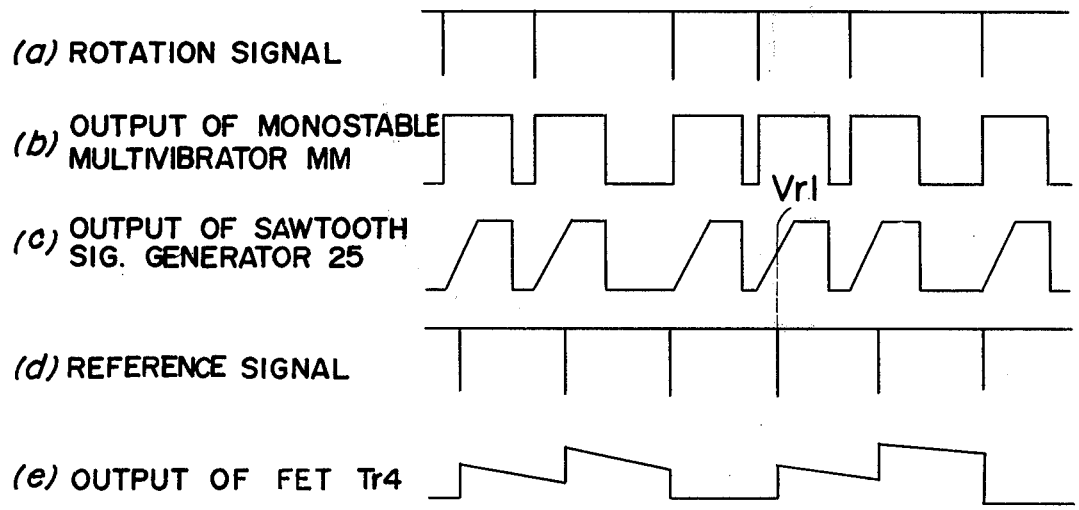
Figure 5:
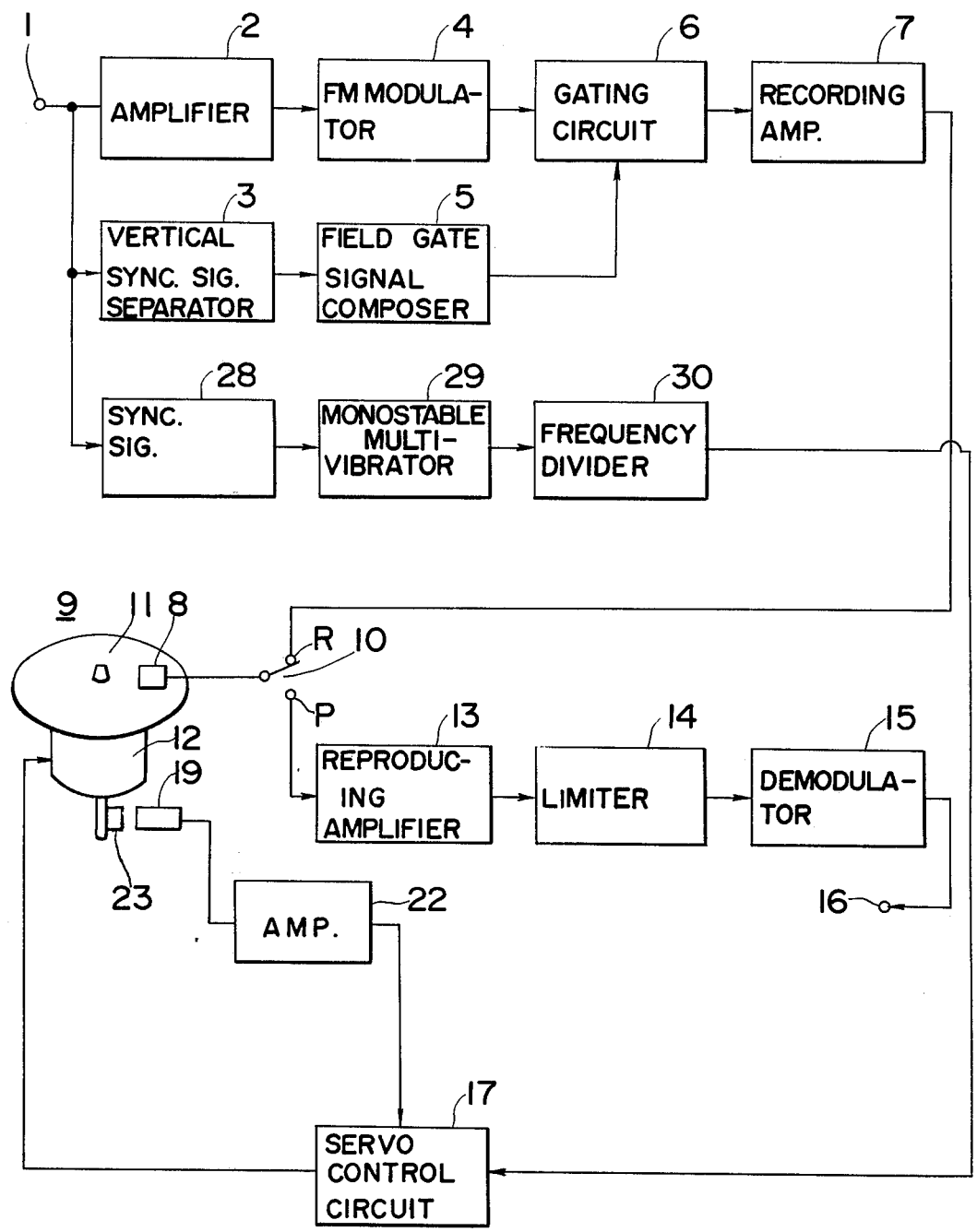

The present invention will be hereinafter fully described in connection with preferred embodiments thereof with reference to attached drawings, in which:

FIG. 1 is a block diagram showing the first embodiment of a servo system according to the present invention, FIG. 2 is a schematic diagram showing waveforms of a reference signal employed in the present invention, FIG. 3 is a schematic circuit diagram of a servo control circuit used in the first embodiment, FIG. 4 is a timing and waveform diagram showing the operation of the servo control circuit shown in FIG. 3, FIG. 5 is a schematic block diagram of a second embodiment of the present invention, FIG. 6 is a schematic block diagram of a third embodiment of the present invention, and FIG. 7A and 7B show shows waveforms of the beginning portion of one field of a composite video signal.

Before the description proceeds, it is noted that the servo system in accordance with the present invention is useful in, and its advantages primarily realized when used with, a field recording system, but it may be used also in a frame recording system and is useful not only in NTSC system, but also in other system such as PAL, SECAM, etc...

Referring to FIGS. 1 to 3, a composite video signal is applied through an input terminal 1 to an amplifier 2 and a vertical synchronizing signal separator 3. The composite video signal thus applied to the amplifier 2 is amplified and, after the amplitude thereof has been clamped is applied to an FM modulator circuit 4, by which the composite video signal is frequency modulated.

On the other hand, vertical sync. signals are separated from the composite video signal by means of the vertical sync. separator 3. The vertical sync. signals are applied to a field gate generating circuit 5 in which gate pulses, each having a period corresponding to the period of one field of the video signal are generated. The gate pulses are applied to a gate circuit 6 to which the FM modulated video signal is applied on another input terminal. Said gate circuit 6 allows one field of the composite video signal to pass therethrough to a recording amplifier 7.

The single field of the composite video signal amplified in the recording amplifier 7 is applied to a recording head 8 of a disc memory device 9 through a change-over switch 10. This one field of the composite video signal is recorded in one circular track of the magnetic disc 11 which is mounted on a rotational spindle and rotated at 3600 revolutions per minute, by an electric motor 12.

When the change-over switch 10 is changed over to complete the circuit between the head 8 and an amplifier 13, the video signal recorded in the track of the disc is read out by the head 8 and then applied to the amplifier 13. This read-out signal is amplified in the amplifier 13 and then applied to a limiter 14 in which the video signal is clamped. The output of the limiter 14 is applied to a FM demodulator 15, and, one field of original video signal which is used for the conventional television receiver is produced at the terminal 16.

According to the present invention, the electric motor 12 is driven in rotation by a phase controlled signal produced by a servo control circuit 17 which is operated by reference signal applied from a reference signal generator 18' and a signal indicative of the rotational speed of the motor 12.

The reference signal generator 18' includes an oscillator 18 which generates a pulse train having a frequency equal to that of the horizontal sync. signal included in the composite video signal. The output signal of the reference signal oscillator 18 is applied to a wave shaping circuit 20 in which the waveform of the output signal is shaped into a rectangular shape as shown in FIG. 2. The frequency of the output pulses of the shaping circuit 20 is approximately 263 pulses per 1/60th of a second. The output pulses of the shaping circuit 20 are fed to a frequency divider 21. The frequency divider 21 produces a pulse train reference signal of which the cyclic period is 263 H (H means a period of one horizontal scanning line).

The reference signal is applied to the servo control circuit 17. The servo control circuit 17 also receives the rotational speed signal through the amplifier 22, which is fed from the rotation detector 19 which is mounted near the rotating shaft of the electric motor 12 so as to produce one pulse, when the electric motor 12 accomplishes one rotation, by detecting the movement of the magnetic pole piece 23 attached to the rotating shaft of the electric motor 12.

The servo control circuit 17 controls the rotational phase of the electric motor 12 in such a way that the electric motor 12 rotates in synchronism with the reference signal fed from the frequency divider 21.

FIG. 3 shows the details of the servo control circuit 17. In the circuit of FIG. 3, a transistor Tr1 receives the reference signal from the frequency divider 21 at its base through a coupling capacitor C1 which with a resistor R3, comprises a differentiator and this transistor Tr1 is brought into its ON or OFF states in response to the reference signal.

On the other hand, the rotational speed signal is fed to the monostable multi-vibrator circuit MM which produces a pulse train signal, each pulse having period of T as shown in FIG. 4(B), in response to the application of the rotational speed signal. The output pulse of the monostable multi-vibrator, MM is fed to the base of a transistor Tr2 which constitutes a sawtooth signal generator 25 of the bootstrap circuit type together with capacitors C2 and C3, resistors R1 and R2. The transistor Tr2 begins to conduct in response to the rise of the pulse fed from the monosable multi-vibrator MM and produces a sawtooth signal as shown in FIG. 4(C). When the transistor Tr1 is switched to its OFF condition in response to the application of the reference signal, the collector voltage of the transistor Tr1 is applied to the base of the transistor Tr3, to trigger the latter on. When the transistor Tr3 conducts, the voltage appearing on the capacitor C3 is transferred to the gate of the field effect transistor (hereinafter designated as FET) Tr4 and the FET Tr. 4 stores, or memorizes, the voltage value charged on the capacitor C3, at the time when the transistor Tr3 conducts.

The output voltage of the FET Tr4, which is proportional to the voltage of the capacitor C3, is amplified by a D.C. amplifier 26 which is composed of transistors Tr5 and Tr6. A transistor Tr7 receives at its base the output voltage of the D.C. amplifier 26 and supplies the drive voltage required to operate the electric motor 12.

When the electric motor 12 rotates at normal speed and thus the recording disc completes one rotation during the period of 263H, the pulses of the rotational speed signal fed from the amplifier 22 are synchronized in phase with that of pulses of the reference signal fed from the frequency divider 21. Accordingly, the reference signal and the rotational speed signal are applied to the servo control circuit 17 simultaneously. Under such a condition, the transistor Tr3 conducts during the period of time during which the output voltage of the sawtooth signal generator 25 is normal voltage and, therefore, the voltage of the FET Tr4 is zero and the electric motor 12 rotates at normal speed.

However, if the rotational speed of the electric motor 12 becomes faster than the normal speed, the phase of a pulse of the rotational speed signal advances relative to the phase of the corresponding pulse of the reference signal with which the noted rotational speed signal pulse should be synchronized. The rotational speed signal is fed from the rotation detector 19 through the amplifier 19 to the servo control circuit 17 before the reference signal is fed thereto, and the monostable multi-vibrator MM in response thereto produces a pulse, so that the capacitor C3 begins to charge before the reference signal is fed to the servo control circuit 17. When the reference signal is fed to the servo control circuit 17, the voltage of the capacitor C3 reaches a predetermined value $V_{r1}$ as shown in FIG. 4(C) which corresponds to the time interval of the out-of-phase relationship between the rotational signal and the reference signal. Accordingly, the voltage $V_{r1}$ is fed to the FET Tr4 and stored therein by conduction of the transistor Tr3, so that the D.C. amplifier 26 produces an output voltage proportional to the voltage $V_{r1}$. In response to the output voltage of the D.C. amplifier 26, the transistor Tr7 produces a voltage which is lower than the normal output voltage and, therefore, the rotational speed of the electric motor 12 decreases so that the phase of the rotational speed signal sensed from the electric motor 12 is controlled and brought into synchronism with the reference signal.

On the other hand, if the rotational speed of the electric motor 12 becomes lower than the normal speed, the phase relationship between the rotational signal and reference signal becomes the reverse of the above case. Under such a condition, the rotational signal is fed to the servo control circuit 17 behind, or lagging the reference signal and, therefore, the electric motor 12 is driven by an output voltage from Tr7 higher than the normal value. Accordingly, the rotational speed of the electric motor 12 increases so that the rotational phase of the disc advances whereby the motor 12, and thus the disc 11, are rotated again on synchronism with the reference signal.

From the foregoing, it is apparent that the magnetic disc 11 is controlled so as to rotate wth a period of 263H.

Therefore, the horizontal synchronizing signals are recorded at uniform intervals even on the portion where the last and first composite video signals of one field are recorded adjacent to each other on one circular track, since one field of the composite video signal is recorded on one circular track of the magnetic disc which rotates with a period of 263H. Accordingly, skew on the picture can be advantageously avoided.

According to the present invention, although such portion where no video signal is recorded over half of H remains at the end portion of the recording track, this portion can be negligible so far as the picture displayed on the kine-scope is concerned.

FIG. 5 shows another embodiment of the present invention; elements common to those of FIG. 1 are labelled with identical reference numerals. In this embodiment, the composite video signal is applied to the horizontal synchronizing signal separator 28, in which the horizontal sync. signal is separated from the composite video signal. Depending upon whether an even-numbered or an odd-numbered field is sampled by the gating circuit 6, horizontal sync. signal sampled by the sync. signal separator 28 is as shown in FIG. 7(A) or 7(B), respectively.

Each horizontal sync. signal thus sampled is shaped by a monostable circuit, or multi-vibrator, 29 into a corresponding rectangular pulse. In order to extract one horizontal synchronizing pulse at intervals of 1H during the duration of the equalizing pulses of the composite video signal, the width of the output pulse of the monostable multi-vibrator 29 is selected to be a value within the range of from ½H to 1H. The rectangular pulses thus shaped are applied to a divide by 263 frequency dividing circuit 30 so that the frequency divider 30 produces a reference signal having a period of 263H. The reference signal is fed to the servo control circuit 17.

The electric motor 12, and thus the magnetic disc 11, rotate in synchronism with the reference signal under the control of the servo control circuit 17. However, the operation thereof is similar to the operation described hereinbefore, and therefore explanation thereof is herein omitted.

FIG. 6 shows a further embodiment of the present invention, like elements to those of FIGS. 1 and 5 again being identified by identical numerals. In FIG. 6, a horizontal sync. signal separator 31 separates horizontal sync. signals included in the period of the vertical sync. signal as shown at (a) in FIG. 7(A), and in FIG. 7(B) or in the period of the equalizing pulses as indicated at (b) and (c) in FIG. 7(A) and FIG. 7(B). The separated pulses are applied to a divide by 272 frequency divider 32 in which the frequency is a reference signal having a period of 263H. The reference signal is fed to the servo control circuit 17.

In the above description, there is explained a technique of false frequency division to produce the reference signal having a period of 263H, where H is the period of the horizontal synchronizing signals. However, practically, the false frequency division, again in reference to the horizontal synchronizing signals, may be in the range of from approximately 260 to 270H for developing the reference signal for the servo system.

Numerous modifications and adaptations of the system of the invention will be apparent to those skilled in the art and thus it is intended by the appended claims to cover all such modifications and adaptations which fall within the true spirit and scope of the invention.

What is claimed is:

1. A servo system for use in a video signal recording and playback apparatus, for controlling the speed of rotation of an electric motor which drives a recording medium in repeating cycles of rotation and in which one field of the composite video signal is recorded on a predetermined track of the recording medium, in each such cycle, which comprises:

signal generating means for generating a reference signal having a period equal to an integral multiple of the horizontal synchronizing period of the composite video signal, said reference signal period being substantially equal to the period of one field of the composite video signal, means responsive to each complete rotation of the electric motor for generating a rotational signal indicative of the speed of rotation thereof, and a servo control circuit which controls the speed of rotation of the electric motor in response to a phase difference between the reference signal and the rotational signal indicative of the rotational speed of the electric motor.

2. A servo system as claimed in claim 1, wherein said signal generating means comprises:

a signal separator which separates the horizontal synchronizing signal from the composite video signal, and a frequency dividing circuit for receiving the separated horizontal synchronizing signal and producing the reference signal as its output, the frequency of the reference signal being equal to a selected value in the range of from 1/260 to 1/270 of the horizontal synchronizing frequency.

3. A servo system claimed in claim 1, wherein said signal generating means comprises an oscillator circuit for generating an oscillatory signal substantially corresponding to the horizontal line period of the video signal, and means for frequency dividing the oscillatory signal by a factor in the range of from 260 to 270 to produce the reference signal.

4. A servo system claimed in claim 3, wherein:
   said frequency dividing means divides the frequency of the oscillatory signal by 263.

5. A servo system as recited in claim 1 wherein said servo control circuit includes:

a monostable circuit set to an unstable state in response to each rotational signal and automatically reset within the period of the reference signal, a sawtooth wave generator responsive to the output of said monostable circuit for generating a sawtooth signal initiating at each setting of said monostable circuit, memory means responsive to the reference signal for storing a voltage corresponding to the output of said sawtooth wave generator at the time of the reference signal, and means responsive to the output of said memory means in each reference period to control the energization and thereby the speed of rotation of said motor, thereby to maintain synchronism of the motor rotation and thereby the recording medium with the successive fields of the composite video signal to be recorded.

6. A servo system as recited in claim 5 wherein said memory means comprises a field effect transistor and there is further provided a transistor coupling the output of said sawtooth wave generator to the gate of the field effect transistor, said coupling transistor being switched into conduction in response to each reference signal to couple the then existing voltage level of the output of the sawtooth generator to the gate of the field effect transistor, said field effect transistor memorizing the voltage thus coupled to its gate by said coupling transistor.

7. A servo system as recited in claim 6 wherein said means responsive to the output of said memory means comprises a DC amplifier receiving the output of said field effect transistor and producing an output current of a level in accordance with the memorized voltage value, thereby to control the energization and thus the speed of rotation of said motor in each successive period of the reference signal.

* * * * *

UNITED STATES PATENT AND TRADEMARK OFFICE
CERTIFICATE OF CORRECTION

PATENT NO. : 3,959,819
DATED : May 25, 1976
INVENTOR(S) : MORIHIRO KUBO

It is certified that error appears in the above-identified patent and that said Letters Patent are hereby corrected as shown below:

Column 1, line 44, change " has" to --shows--.
Column 4, line 42, change "zero" to --normal voltage--.
Column 4, line 51, change "amplifier 19" to --amplifier 22--.

Signed and Sealed this

Seventh Day of September 1976

[SEAL]

Attest:

RUTH C. MASON
Attesting Officer

C. MARSHALL DANN
Commissioner of Patents and Trademarks